United States Patent [19]
Grajewski et al.

[11] Patent Number: 5,517,592
[45] Date of Patent: May 14, 1996

[54] SLEEVE FOR BRANCH OR JOINT AREAS IN OPTICAL OR ELECTRICAL CABLES

[75] Inventors: Franz Grajewski, Stadthagen; Hans-Holger Freckmann, Langenhagen; Werner Stieb; Zbigniew Wielgolaski, both of Stadthagen; Reinhard Schöttker, Langenhagen, all of Germany

[73] Assignee: kabelmetal electro GmbH, Hannover, Germany

[21] Appl. No.: 327,382

[22] Filed: Oct. 21, 1994

[30] Foreign Application Priority Data

Oct. 22, 1993 [DE] Germany .............................. 9316172 U

[51] Int. Cl.⁶ .............................. G02B 6/00; H02G 3/00
[52] U.S. Cl. .............................. 385/138; 385/86; 385/87; 385/100; 385/136; 385/137; 174/70 R; 174/72 R; 174/74 R; 174/77 R
[58] Field of Search .............................. 385/76, 77, 81, 385/86, 87, 99, 100, 136, 137, 138, 139, 134; 174/70 R, 71 R, 72 R, 73.1, 74 R, 76, 77 R

[56] References Cited

U.S. PATENT DOCUMENTS

| | | | |
|---|---|---|---|
| 4,085,286 | 4/1978 | Horsma et al. | 174/92 |
| 4,172,746 | 10/1979 | Le Noane et al. | 156/91 |
| 4,298,415 | 11/1981 | Nolf | 156/85 |
| 4,400,579 | 8/1983 | Nolf | 174/854 |
| 4,413,922 | 11/1983 | Nolf | 403/341 |
| 4,697,873 | 10/1987 | Bouvard et al. | 385/86 |
| 4,779,951 | 10/1988 | Bouvard et al. | 385/99 X |
| 4,795,230 | 1/1989 | Garcia et al. | 385/138 X |
| 4,799,757 | 1/1989 | Goetter | 385/135 X |
| 4,813,754 | 3/1989 | Priaroggia | 385/86 X |
| 4,891,640 | 1/1990 | Ip | 340/853 |
| 4,909,591 | 3/1990 | Capol | 385/100 X |
| 5,037,177 | 8/1991 | Brown et al. | 385/59 |
| 5,048,918 | 9/1991 | Daems et al. | 385/86 |
| 5,050,945 | 9/1991 | Sorensen | 385/95 |
| 5,097,526 | 3/1992 | Kochsmeier et al. | 385/99 |
| 5,099,399 | 3/1992 | Miller et al. | 362/32 |
| 5,119,457 | 6/1992 | Callahan | 385/107 |
| 5,121,458 | 6/1992 | Nilsson et al. | 385/100 |
| 5,125,060 | 6/1992 | Edmundson | 385/100 |
| 5,204,933 | 4/1993 | Marx | 385/53 |
| 5,222,177 | 6/1993 | Chu et al. | 385/105 |
| 5,280,556 | 1/1994 | Jones | 385/139 |
| 5,426,715 | 6/1995 | Moisson et al. | 385/76 |

FOREIGN PATENT DOCUMENTS

| | | | |
|---|---|---|---|
| 2218671 | 10/1976 | France | 174/92 X |
| 3614426 | 4/1986 | Germany | 174/92 X |
| 3932747 | 9/1989 | Germany | 174/92 X |
| 9100359 | 5/1991 | Germany | 174/92 X |
| 9100979 | 5/1991 | Germany | 174/92 X |
| 9217709 | 4/1993 | Germany | 385/100 X |

OTHER PUBLICATIONS

Thermofit Tubing Splice Encapsulation Directions, Published 1968.

*Primary Examiner*—Brian Healy
*Attorney, Agent, or Firm*—Ware, Fressola, Van Der Sluys & Adolphson

[57] ABSTRACT

A sleeve for receiving branch or joint areas in optical or electrical cables, comprises a stable, essentially cylindrical hollow body (8) with at least one open end to receive the branch or joint areas, where a sleeve head (1) is inserted into the open end(s) and the sleeve head(s) (1) has (have) passage openings (2) in the form of radial slots (2) for the incoming or outgoing cables (3, 4). The slots (2) contain sealing bodies (11), which encompass the incoming or outgoing cable (3, 4) and seal the slots (2).

17 Claims, 5 Drawing Sheets

SLEEVE FOR BRANCH OR JOINT AREAS IN OPTICAL OR ELECTRICAL CABLES

BACKGROUND OF THE INVENTION

1. Field of the Invention

This invention concerns a sleeve for branch or joint areas in optical or electrical cables.

2. Description of the Prior Art

A sleeve for a branch or joint area of cables is known from German document No. DE-OS 40 39 242, which consists of a bushing that surrounds the branch or joint area, and frontal bodies that seal the ends. The frontal bodies contain passage openings for cables in the form of radial slots, so that the sleeve can simply and equally be used for uncut and for cut cables. The frontal bodies and the bushing are surrounded by a shrinkable tube or sleeve, which is shrunken onto the incoming or outgoing cables. One side of the shrinkable tubing is sealed by a clamp between two cables.

A hooded sleeve is known from German document No. DE-GM 92 17 709, which comprises a foot part and a hood part that covers the foot part. In this case as well, radial cuts are made in the foot part for inserting the cable. The separation area between the hood part and the foot part is sealed by shrinkable tubing or a shrinkable sleeve. The shrinkable tubing is sealed between two cables by a clamp placed on the end.

Both of the above solutions have in common that a shrinkable tube or a shrinkable sleeve is used for sealing, which is shrunk onto the sleeve by applying heat. The seal is achieved with a coating of hot-melt adhesive applied to the inside surface of the shrinkable tubing. This adhesive coating makes it difficult to reopen the sleeve. In addition, the use of heat, e.g. from an open flame or a hot air blower, is often undesirable or impossible.

SUMMARY OF THE INVENTION

An object of the invention is the provision of a sleeve that can quickly and securely be installed on optical or electrical Cables without the use of special tools such as drills, boring implements, seal injection installations, shrink-burners, etc., and can be reopened at any time without any difficulty.

It has been found that the foregoing objects can be readily attained by providing a sleeve for receiving branch or joint areas in optical or electrical cables, the sleeve having an essentially cylindrical hollow body for receiving the branch or joint areas and at least one open end for receiving a sleeve head having passage openings in the form of radial slots for incoming or outgoing cables; sealing bodies are provided in the slots which encompass the incoming or outgoing cables and seal the slots.

The present invention has the direct advantage of simplifying the installation of a sleeve by eliminating the need for special tools during installation. The invention also has the advantage that no specialists are required to install the sleeve; the sleeve can rather be correctly installed by any employee who has received some brief instruction.

The invention can be used for sleeves that are closed on one end and are equipped with only one sleeve head, wherein a hollow body with only one open end is inserted, as well as for passage sleeves with a bushing tube that is open at both ends and has two sleeve heads. The bushing tube for a passage sleeve comprises two half shells, which are assembled to the bushing tube with holding wedges.

Because each cable is individually inserted and sealed in the sleeve head, independently of other cables, only one particular cable is removed from the reopened sleeve head. The cable sealing and clamping areas are separated from each other. Cable clamping takes place inside and outside of the sleeve head, so that the sealed area in the cable remains free of mechanical stresses.

DETAILED DESCRIPTION OF THE INVENTION

Figure 1:
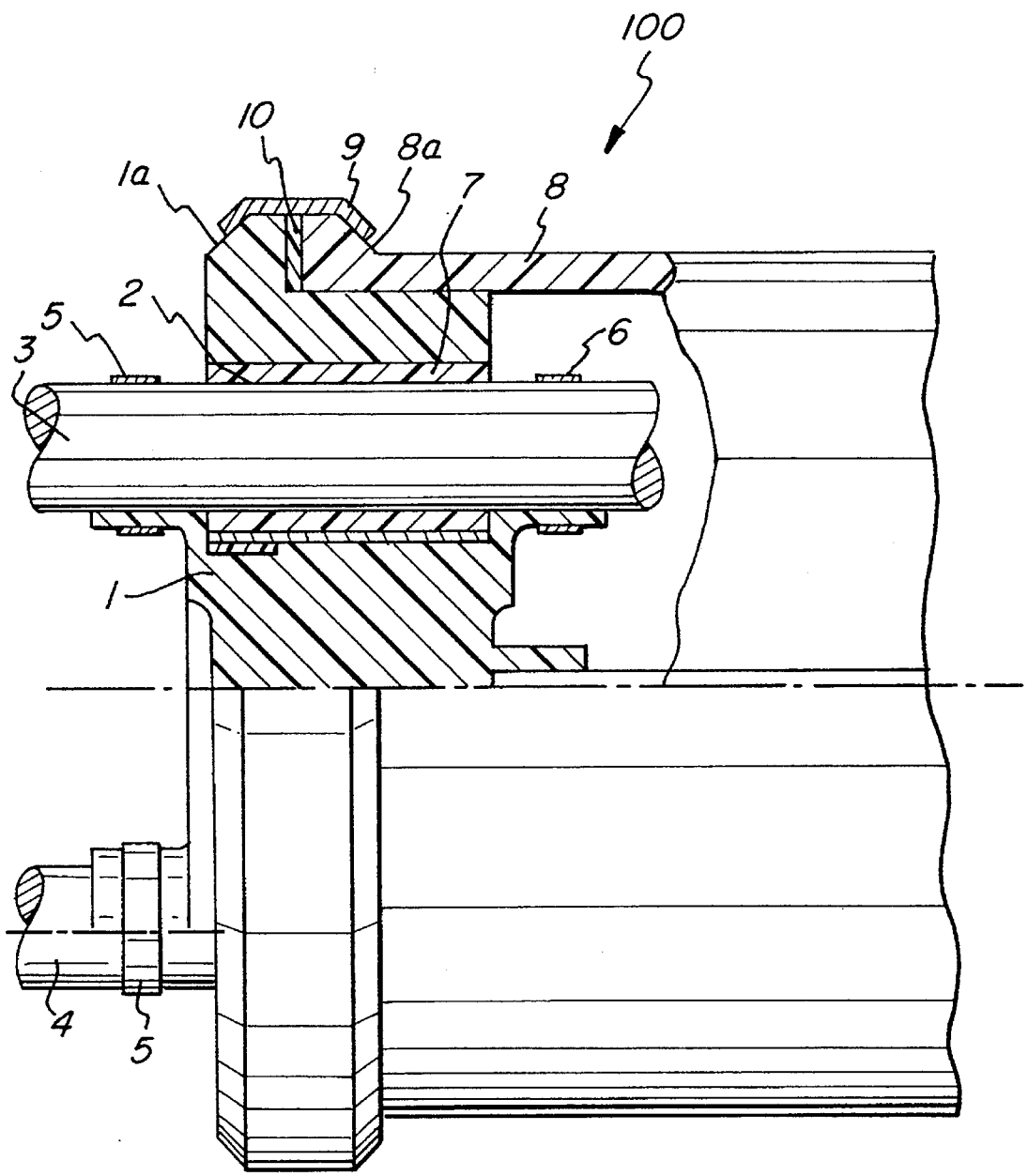
FIG. 1 is a side view, in partial cross section, of incoming or outgoing areas of a sleeve assembly.

In FIG. 1, a sleeve assembly 100 comprises a sleeve head of the present invention which is designated by 1 and is configured as an injection molded plastic part. The sleeve head 1 contains various passages 2, through which cables 3 and 4 penetrate to the inside of the sleeve. The cables 3 and 4 are held by so-called cable binders 5 and 6 in the sleeve head 1. The passages 2 are sealed against moisture by seals 7. In the case of a connection sleeve, the inside of the sleeve is shielded from the outside by a sleeve tube 8, which may be closed on one end. The sleeve tube 8 comprises two half shells, which are sealed with respect to each other. The sleeve tube 8 forms a stable, substantially cylindrical hollow body.

The sleeve head 1 and the sleeve tube 8 contain inclined planes 1a and 8a, which are enclosed by a tension ring 9 that clamps the sleeve head 1 and the sleeve tube 8 against each other. A sealing ring 10 provides a reliable seal.

Figure 2:
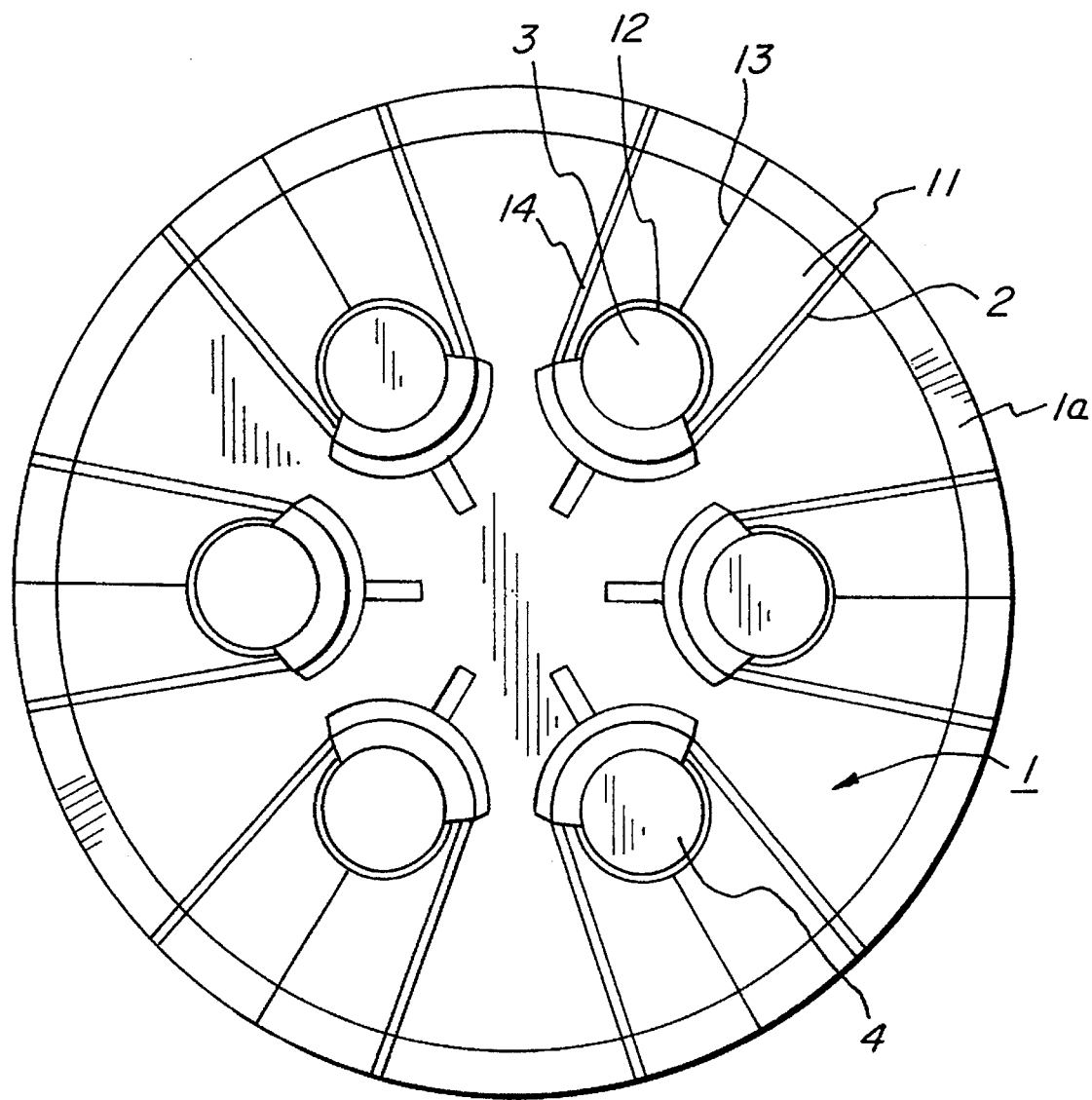
FIG. 2 is a top view of the incoming or outgoing areas of the sleeve assembly of FIG. 1.

As can clearly be seen in FIG. 2, which illustrates a view of the sleeve head 1, the passages 2 are formed by radial slots in the sleeve head 1. Sealing bodies 11 are inserted into the passages 2 and encompass the cables 3, 4. To that end, the sealing bodies 11 contain a slot 13 that extends from an insertion channel 12 for the cables 3, 4 to the circumference of the sealing bodies 11. The sealing bodies 11 are configured as connecting elements with a mechanically strong shell and a core comprised of an elastomer material. Seals 14 are located between the passages 2 and sealing bodies 11.

Figure 3:
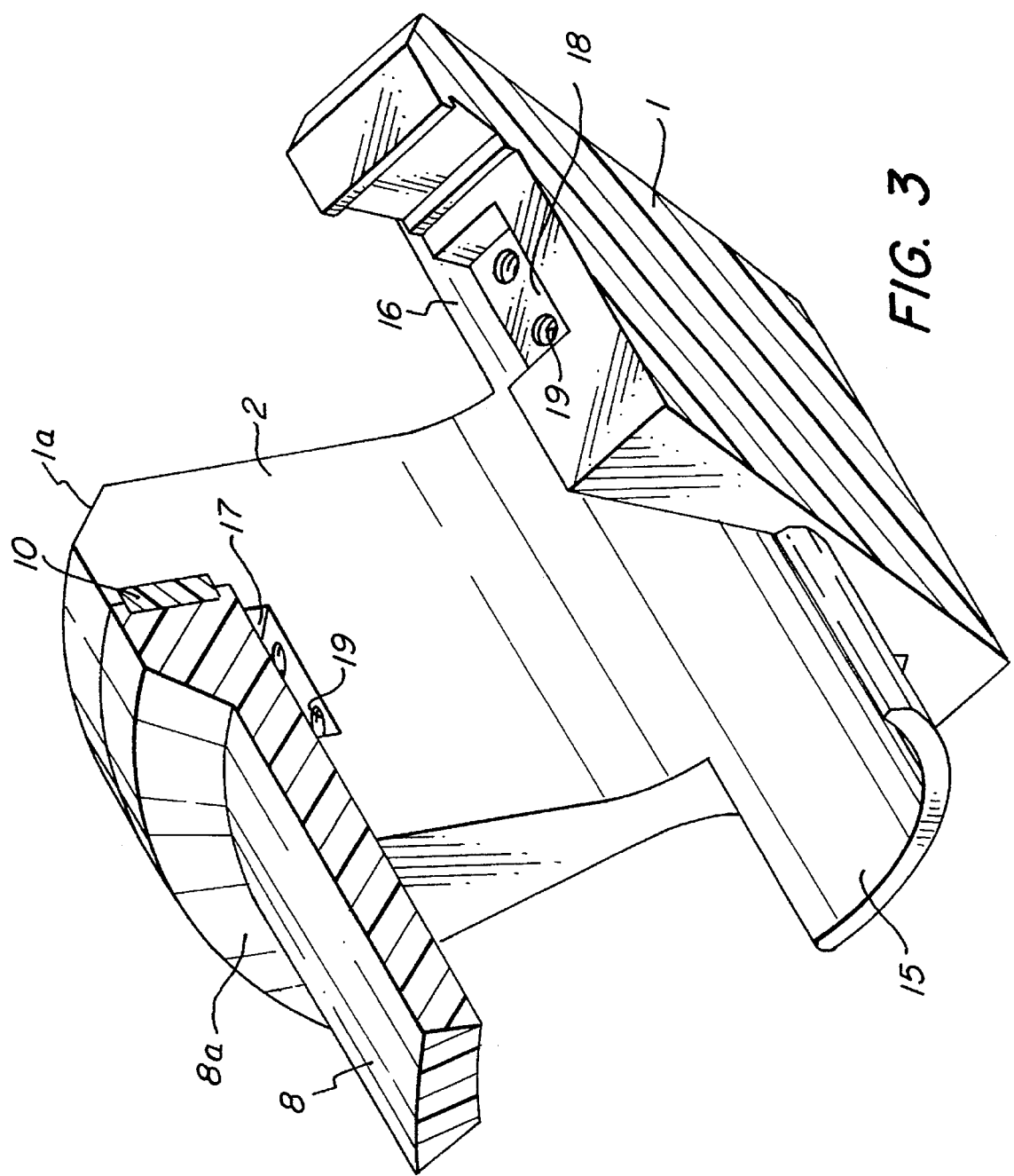
FIG. 3 is a perspective view, partially broken away, of a sleeve head of the sleeve assembly of FIG. 1.

FIG. 3 illustrates a perspective view of a section of the sleeve head 1. Two lugs 15 and 16 on the bottom of passages 2 extend in both directions, and are designed to hold cables 3, 4 by means of the cable binders 5 and 6 illustrated in FIG. 1. In addition, FIG. 3 shows cutouts 17 and 18 in the peripheral surface area on both sides of passages 2. The sealing bodies 11 (FIG. 2) are attached to the passages 2 through the cutouts 17 and 18 and threaded apertures 19 located in the bottom of cutouts 17 and 18.

Figure 4:
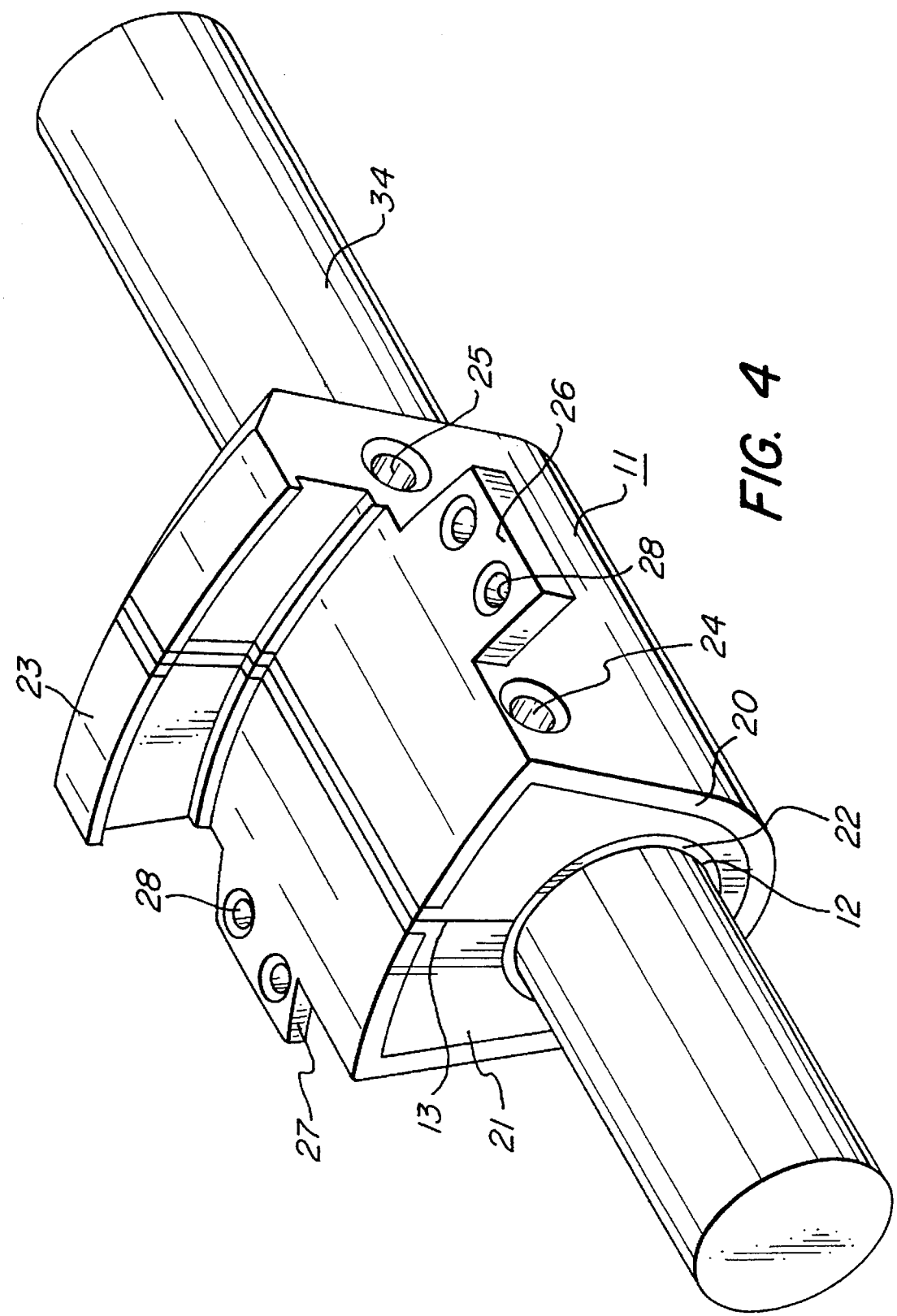
FIG. 4 is a perspective view of a sealing body installed on a cable.

FIG. 4 depicts a sealing body 11, which is placed over a cable 3. The sealing body 11 comprises of an outer shell 20 made of a thermoplastic material. The inside of the shell 20 contains a coating 21 of an elastomer material sprayed into the shell 20. The cable 3 is received in the insertion channel 12 which is formed in the coating 21. If the outside diameter of the cable 3 being inserted into the sleeve is equal to or smaller than the inside diameter of the insertion channel 12, it is necessary to "pad" the cable 3. This is accomplished with a permanently flexible, self-welding mastic band 22. To facilitate flexing or swinging the sealing body 11 open so that it can be installed on the cable, the wall thicknesses of shell 20 and elastomer coating 21 at the lowest point, i.e. where the sealing body 11 rests on the bottom of passage 2 (FIG. 3), are selected accordingly. The cross section and curvature of the outer edge 23 of the sealing body 11 corresponds to the outer edge of sleeve head 1 (FIG. 3). The sealing body 11 contains two passage apertures 24 and 25, which extend through both walls of shell 20 and through the elastomer coating 21. On one side, the passage apertures 24 and 25 are equipped with a thread, so that the sealing body 11 can be securely mounted on the cable 3 by screw bolts (not illustrated) extending through the passage apertures 24 and 25 thereby compressing all sealing surfaces inside the sealing body 11.

Referring to FIG. 3 and 4, the sealing body 11 also contains two lugs 26 and 27 having apertures 28 formed therein. The dimensions of the lugs 26, 27 are designed to fit cutouts 17 and 18 with apertures 28 aligned with the threaded apertures 19. The sealing body 11, which is pressed onto cable 3, is placed into the passage 2 in sleeve head 1, and is secured in passage 2 by not illustrated screw bolts, which are received through apertures 28 for engagement with threaded apertures 19.

Figure 5:
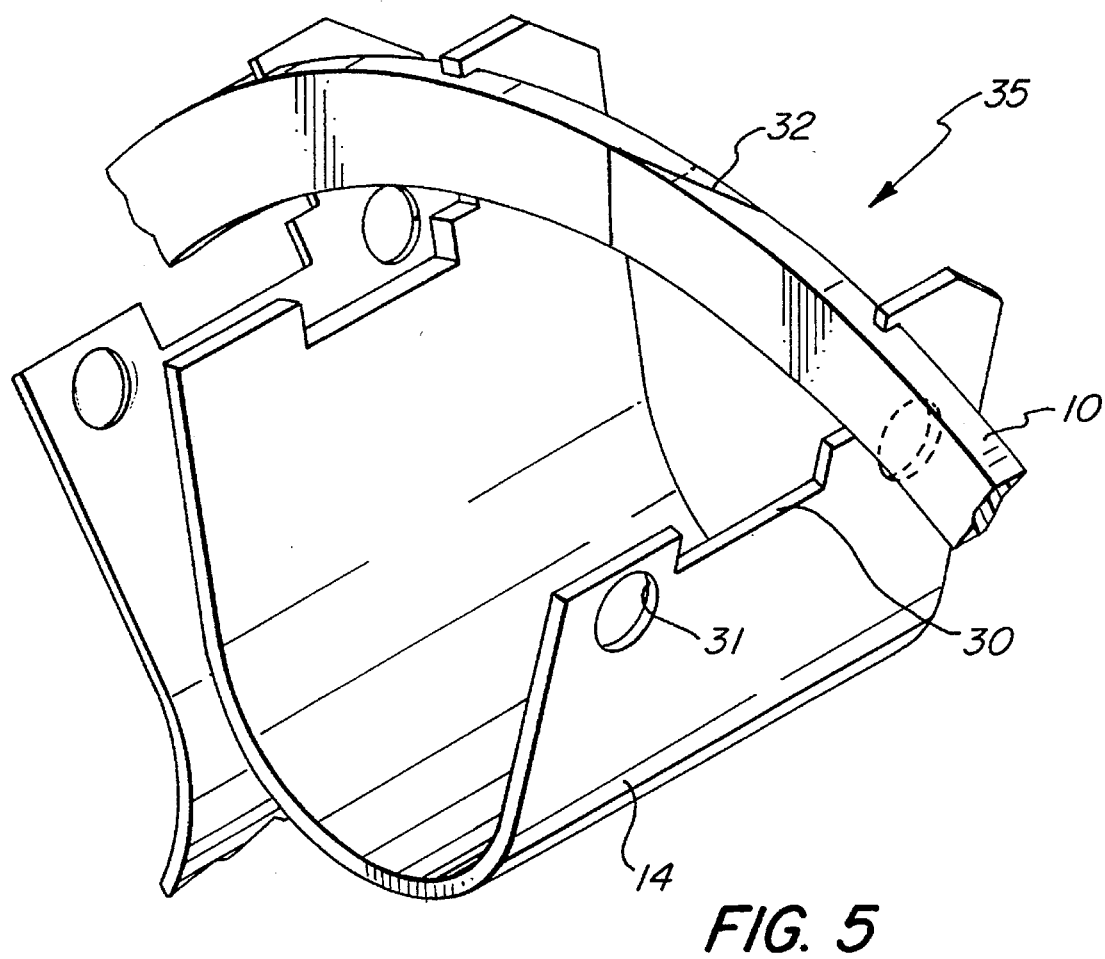
FIG. 5 is a perspective view of a sealing band for securing the sealing body of FIG. 5.

Referring to FIGS. 3, 4 and 5, a sealing element, generally illustrated by the numeral 35, serves to seal the sealing body 11 in the passage 2 of sleeve head 1, and between the sleeve head 1 and the sleeve tube 8 (or hood). The sealing element 35 comprises a sealing ring 10 and several seals 14 in accordance with the number of passages 2. Cutouts 30 are formed in the seals 14 corresponding to the location of the lugs 26, 27. Additionally, apertures 31 are formed in the seals 14 corresponding to the location of the passage apertures 24, 25. The sealing ring 10 and the seals 14 form a part, where the sealing ring 10 is split 32 (cut) over the sealing body 11. The split 32 is required for allowing the insertion and removal of the cables 3 into the sealing bodies 11. The split 32 is at made an angle, to ensure a good seal in the cut area.

The installation of the sleeve according to the principle of the invention will now be explained with the example of a tube which is closed on one end.

Referring to FIG. 4, first the sealing bodies 11 are placed and screwed onto the cables 3 or 4 going in and out of the sleeve. Referring also to FIGS. 2 and 3, the sealing element 35 (FIG. 5) is then positioned on sleeve head 1, which locates the seals 14 in the passages 2. Subsequently, the sealing bodies 11 with cables 3 or 4 are inserted into the passages 2, where they are secured by means of the not illustrated screws in the threaded apertures 19. This seals each sealing body 11 against its corresponding seal 14 in passage 2. Cables 3 and 4 are then attached to the lugs 15 and 16 with the cable binders 5 and 6 (FIG. 1). After all sealing bodies 11 are inserted and all cables 3 and 4 have been attached, the sleeve tube (hood) 8 is positioned and clamped in removable form by the tension ring 9 (FIG. 1) against sleeve head 1. The tension ring 9 may be hinged to facilitate insertion and removal thereof.

The sleeve according to the principle of the invention makes easy and secure reopening possible, where in case of an installation only the concerned cable needs to be removed from sleeve head 1.

Another significant advantage can be seen in that the same elements can be used for both sleeves closed on one end and passage sleeves open on both ends, where the same installation procedures are used in principle.

Although the invention has been described and illustrated with respect to exemplary embodiments thereof, the foregoing and various other changes, omissions and additions may be made therein and thereto without departing from the spirit and scope of the present invention.

What is claimed is:

1. A sleeve assembly for receiving branch or joint areas in optical or electrical cables, comprising:
   a stable, essentially cylindrical hollow body for receiving the branch or joint areas, said hollow body having at least one open end;
   a sleeve head received in each open end, each sleeve head having passages formed therein in the form of radial slots for receiving incoming or outgoing cables;
   sealing bodies received in said passages, said sealing bodies encompassing the incoming or outgoing cables and sealing said passages; and
   wherein said sealing bodies can be clamped to its respective cable.

2. A sleeve assembly according to claim 1, wherein each of said sealing bodies comprises:
   a shell made of a thermoplastic material, said shell having an outer surface and an inner surface;
   an elastomer coating permanently attached to said shell inner surface, said elastomer coating having a lengthwise insertion passage formed therein for receiving its respective cable; and
   a slot formed in said shell and said elastomer coating between said insertion passage and said shell outer surface, its respective cable being received in said insertion passage through said slot.

3. A sleeve assembly according to claim 1, further comprising a flexible seal between each of said sealing bodies and said sleeve head in the area of said passages.

4. A sleeve assembly according to claim 1, further comprising mechanical means for attaching said sealing bodies in said passages.

5. A sleeve assembly according to claim 1, wherein said passages and said sealing bodies have an essentially V-shaped cross section.

6. A sleeve assembly according to claim 1, wherein said passages are oriented in a lengthwise direction of said sleeve head and wherein cup-shaped lugs are formed on both sides of said sleeve head at opposite ends of said passages to receive the cables.

7. A sleeve assembly according to claim 1, wherein said hollow body comprises a flanged extension and wherein said sleeve head and said sealing bodies extend into flanges in a peripheral direction and are clamped by means of a tension ring to said flanged extension of said hollow body.

8. A sleeve assembly according to claim 7, wherein said tension ring comprises a hinge mechanism.

9. A sleeve assembly according to claim 7, wherein said flanged extensions of said sleeve head and said hollow body have inclined planes which are covered by said tension ring.

10. A sleeve assembly according to claim 7, further comprising a sealing ring located between said sleeve head and said hollow body, and a seal located between said sealing body and said sleeve head.

11. A sleeve assembly according to claim 10, wherein said sealing ring and said seals are configured as one part, and wherein said sealing ring is separated by an angled cut in an area of said passages.

12. A sleeve assembly according to claim 2, wherein said sealing bodies can be clamped to the cables.

13. A sleeve assembly according to claim 2, further comprising a flexible seal between each of said sealing bodies and said sleeve head in the area of said passages.

14. A sleeve assembly according to claim 2, further comprising mechanical means for attaching said sealing bodies in said passages.

15. A sleeve assembly according to claim 2, wherein said passages and said sealing bodies have an essentially V-shaped cross section.

16. A sleeve assembly according to claim 2, wherein said passages are oriented in a lengthwise direction of said sleeve head and wherein cup-shaped lugs are formed on both sides of said sleeve head at opposite ends of said passages to receive the cables.

17. A sleeve assembly according to claim 2, wherein said hollow body comprises a flanged extension and wherein said sleeve head and said sealing bodies extend into flanges in a peripheral direction and are clamped by means of a tension ring to said flanged extension of said hollow body.

* * * * *